(12) United States Patent
Sawada

(10) Patent No.: US 8,045,242 B2
(45) Date of Patent: Oct. 25, 2011

(54) COLOR CONVERSION APPARATUS AND COLOR CONVERSION METHOD

(75) Inventor: Takayuki Sawada, Numazu (JP)

(73) Assignees: Kabushiki Kaisha Toshiba, Tokyo (JP);
Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/900,680

(22) Filed: Oct. 8, 2010

(65) Prior Publication Data

US 2011/0026088 A1 Feb. 3, 2011

Related U.S. Application Data

(63) Continuation of application No. 11/877,741, filed on Oct. 24, 2007, now Pat. No. 7,826,112.

(51) Int. Cl.
*G03F 3/08* (2006.01)
*G06F 15/00* (2006.01)
*G06K 9/00* (2006.01)

(52) U.S. Cl. .......................... 358/520; 358/1.9; 382/167

(58) Field of Classification Search ................... 358/1.9, 358/520, 518, 501, 523, 530, 538, 1.13, 1.1; 382/167, 162, 164, 165
See application file for complete search history.

(56) References Cited

U.S. PATENT DOCUMENTS

| | | | |
|---|---|---|---|
| 5,684,895 A * | 11/1997 | Harrington | .................... 382/233 |
| 6,567,544 B1 | 5/2003 | Kanno et al. | |
| 6,788,308 B2 | 9/2004 | Reavy et al. | |
| 7,301,672 B2 | 11/2007 | Abe et al. | |
| 7,362,470 B2 | 4/2008 | Sawada | |
| 7,423,383 B2 | 9/2008 | Kawano | |
| 7,501,771 B2 | 3/2009 | Kawano | |
| 7,508,548 B2 | 3/2009 | Kuwata et al. | |

(Continued)

FOREIGN PATENT DOCUMENTS

JP 2004013457 1/2004

OTHER PUBLICATIONS

U.S. Office Action dated Dec. 10, 2009 corresponding to U.S. Appl. No. 11/877,741, filed Oct. 24, 2007.

*Primary Examiner* — Madelein A Nguyen
(74) *Attorney, Agent, or Firm* — Turocy & Watson, LLP

(57) ABSTRACT

A color conversion apparatus includes: an original data analyzing unit configured to extract background color information of an original and color information of a character and line drawing object on the background; a background color changing unit configured to change the background color of the original when necessary, on the basis of the result of comparing the background color information acquired from the original data analyzing unit with a preset threshold value; and a character and line drawing color correcting unit configured to change lightness of the character and line drawing color in a way that increases a lightness difference between the background color for printing and the character and line drawing color on the background when necessary, on the basis of the background color information of the original acquired from the original data analyzing unit, the background color information for printing acquired from the background color changing unit, and the character and line drawing color information on the background acquired from the original data analyzing unit. The color conversion apparatus contributes to saving of color material, reduction in load on a printer engine, prevention of stripping of color material, and prevention of deformation of paper.

20 Claims, 5 Drawing Sheets

U.S. PATENT DOCUMENTS

| | | |
|---|---|---|
| 7,899,244 B2 * | 3/2011 | Makino .......................... 382/167 |
| 2001/0019427 A1 | 9/2001 | Komatsu |
| 2002/0113801 A1 | 8/2002 | Reavy et al. |
| 2003/0002060 A1 * | 1/2003 | Yokoyama et al. ............ 358/1.9 |
| 2004/0080789 A1 * | 4/2004 | Anderson ....................... 358/2.1 |
| 2006/0132871 A1 | 6/2006 | Beretta |
| 2006/0132872 A1 | 6/2006 | Beretta |
| 2006/0209323 A1 | 9/2006 | Sawada |
| 2006/0250669 A1 | 11/2006 | Beretta |
| 2007/0262985 A1 | 11/2007 | Watanabe et al. |
| 2008/0080009 A1 | 4/2008 | Masui et al. |
| 2008/0181507 A1 | 7/2008 | Gope et al. |
| 2008/0218783 A1 | 9/2008 | Do et al. |

* cited by examiner

COLOR CONVERSION APPARATUS AND COLOR CONVERSION METHOD

CROSS-REFERENCE TO RELATED APPLICATIONS

This application is a Continuation of application Ser. No. 11/877,741 filed on Oct. 24, 2007, the entire contents of which are incorporated herein by reference.

BACKGROUND OF THE INVENTION

1. Technical Field of the Invention

The present invention relates to an apparatus and method for carrying out color conversion, and particularly to a color conversion apparatus and a color conversion method that restrain the consumption of color materials for the background with a large area and secure visibility of characters and line drawings on the background.

2. Related Art

JP-A-2004-13457 is a known technique related to the present invention.

Generally, in many presentation slides (slide documents) to be projected by a projector, a color with low lightness is as a background color and a color with high lightness is used as a character and/or line drawing color.

When a slide document with such coloring is printed out, a large amount of color material is consumed for the color of the background color having a large area and the quantity of overlap of the color material increases. As a result, the load on the printer engine increases and it causes, for example, malfunction of an apparatus having a print function such as a printer. Further, when the slide document with such coloring is printed out, stripping of the color material and deformation (for example, curling) of the paper tend to occur in the printed document.

To solve the above problems, a color conversion apparatus having a toner reduction function is proposed.

However, in the traditional color conversion apparatus, since uniform processing is carried out irrespective of the combination of background color and character and line drawing color, there may be a problem that the characters and line drawings on the background are difficult to read.

Thus, a color conversion apparatus and a color conversion method are demanded that restrain the consumption of the color material for the background with a large area and secure certain visibility (readability) of characters and line drawings on the background.

SUMMARY OF THE INVENTION

It is an object of the present invention to provide a color conversion apparatus and a color conversion method that restrain the consumption of the color material for the background with a large area and secure visibility of characters and line drawings on the background.

According to an aspect of the invention, a color conversion apparatus includes: an original data analyzing unit configured to extract color information of a background color and a character and line drawing object from each page of inputted original data; a background color changing unit configured to increase a lightness of the background color, in case where the lightness of the background color is less than a background color lightness evaluation threshold value which is set in advance, while holding a hue and saturation of the background color, on the basis of the background color information acquired from the original data analyzing unit and the predetermined background color lightness evaluation threshold value, and thus change the original background color to a background color for printing; and a character and line drawing color correcting unit configured to change lightness of the character and line drawing color while holding a hue and saturation of the character and line drawing color in a way that increases a lightness difference between the background color for printing and the character and line drawing color on the background of the original, on the basis of the background color information of the original acquired from the original data analyzing unit, the background color information for printing acquired from the background color changing unit, and the character and line drawing color information on the background of the original acquired from the original data analyzing unit, and thus change the character and line drawing color on the background of the original to a character and line drawing color for printing.

According to another aspect of the invention, a color conversion method includes: analyzing original data acquired from each page of an original; acquiring color information of a background color and a character and line drawing object of the original for each page; determining necessity of changing the background color of the original based on the lightness of the background color of the original, and changing the background color in case where necessity of changing the background color of the original is necessary; and determining whether color correction of the character and line drawing color on the background after changing the background color of the original is necessary on the basis of the lightness of the background color after changing the background color of the original and a lightness of the character and line drawing color of the original, and carrying out color correction of the character and line drawing color in case where color correction of the character and line drawing color is necessary.

According to the color conversion apparatus and the color conversion method of the invention, with respect to the color of the background having a large area, a background color that consumes a large amount of color material is detected and its lightness is increased. Therefore, the quantity of color material (consumption of color material) necessary at the time of printing the original and the quantity of overlap of the color material can be effectively reduced. As a result, saving of the color material, reduction of load on the printer engine, prevention of stripping of the color material, and prevention of deformation of the paper can be realized.

BRIEF DESCRIPTION OF THE DRAWINGS

In the accompanying drawings.

DETAILED DESCRIPTION OF THE PREFERRED EMBODIMENTS

Embodiments of a color conversion apparatus and a color conversion method according to the invention will be described with reference to the accompanying drawings.

A color conversion apparatus according to the invention is an apparatus that carries out color conversion in order to restrain the consumption of image material used to print the background and at the same time maintains readability of characters and line drawings (which are other parts than the background), when printing an original. The color conversion apparatus according to the invention is applied, for example, together with an apparatus that prints an original.

First Embodiment

Figure 1:
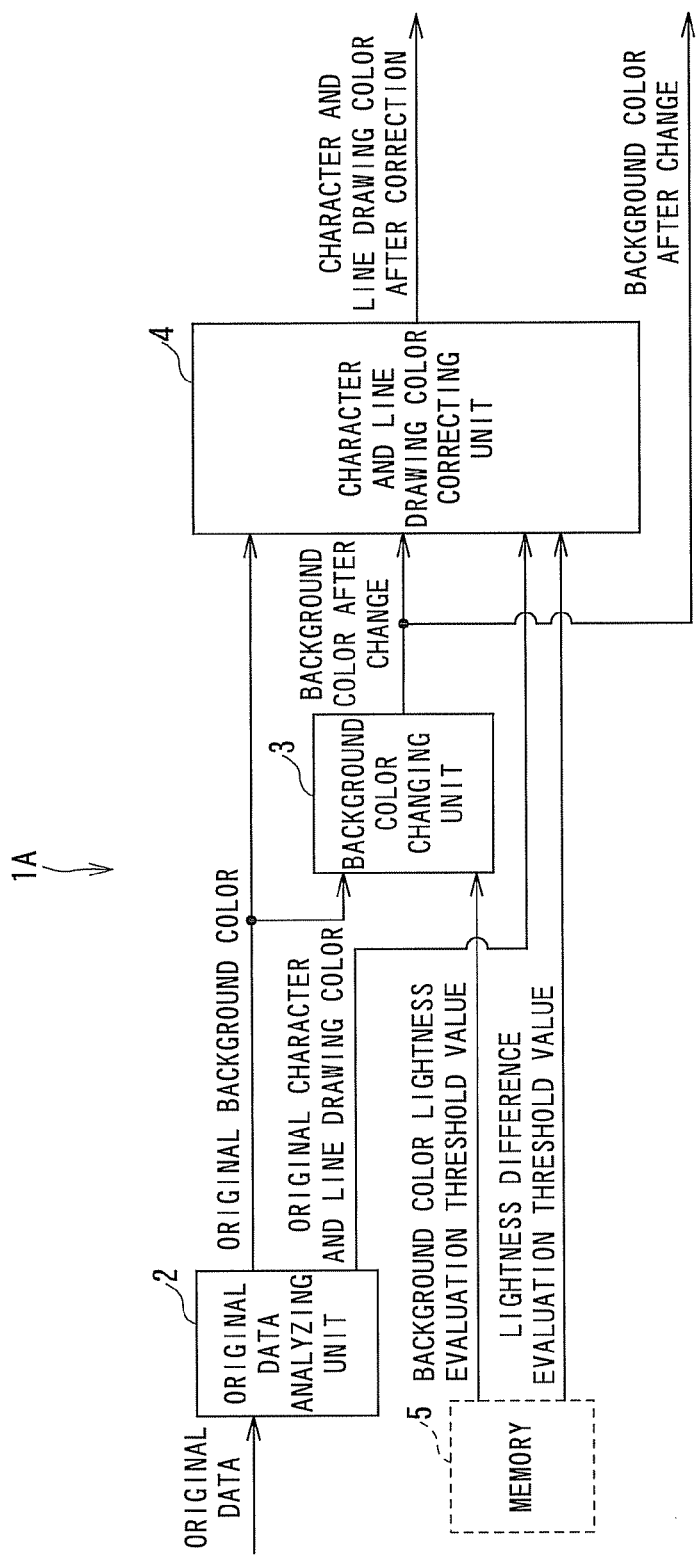
FIG. 1 is a schematic configuration diagram illustrating a configuration of a color conversion apparatus according to a first embodiment of the invention.

FIG. 1 is a schematic configuration diagram illustrating a configuration of a color conversion apparatus 1A, which is an example of the color conversion apparatus according to the first embodiment of the invention.

As shown in FIG. 1, the color conversion apparatus 1A has an original data analyzing unit 2 that acquires, on the basis of original data of an original as a target of color conversion, the background color of the original and color information of a character and line drawing, a background color changing unit 3 that changes the background color acquired by the original data analyzing unit 2, and a character and line drawing color correcting unit 4 that corrects the color of the character and line drawing when necessary.

In the color conversion apparatus 1A, first, original data with a known format such as PDF or XPS is inputted to the original data analyzing unit 2, triggered by a print request from a user.

The original data analyzing unit 2 analyzes the inputted original data, and acquires the value of the color of the background as background color information and the value of the color of the character and line drawing object as character and line drawing object color information for each page.

The value of the background color before color change acquired by the original data analyzing unit 2 (hereinafter, referred to as "original background color") is transmitted to the background color changing unit 3 and the character and line drawing color correcting unit 4. Further, the value of the character and line drawing color before color change (hereinafter, referred to as "original character and line drawing color") is transmitted to the character and line drawing color correcting unit 4.

Incidentally, the color space representing the value of the background color or the character and line drawing color acquired by the original data analyzing unit 2 may be any color space, for example, an RGB color space formed principally by R (red), G (green) and B (blue), a CMYK space formed principally by C (cyan), M (magenta), Y (yellow) and K (black), CIEXYZ or CIELAB standardized by CIE (Commission Internationale de l'Eclairage), and so on.

The background color changing unit 3 evaluates whether the original background color consumes a large amount of color material or not, on the basis of whether the lightness (or quantity of lightness correlation) of the original background color is larger or smaller than a predetermined threshold value that is preset for the lightness (or quantity of lightness correlation) of the background color (hereinafter, referred to as "background color lightness evaluation threshold value"). In accordance with the result of the evaluation, the background color changing unit 3 determines whether correction (change) of the original background color is necessary or not.

The lightness of the original background color is transmitted from the original data analyzing unit 2. In addition, the background color lightness evaluation threshold value is stored in a memory 5. The background color changing unit 3 reads out and thus acquires the background color lightness evaluation threshold value from the memory 5.

As a result of the evaluation of the original background color, in the case where the background color changing unit 3 determines that color correction of the original background is necessary, the background color changing unit 3 changes the original background color. The color information of the background color which has been changed in accordance with the necessity is outputted from the background color changing unit 3 to outside of the color conversion apparatus 1A and to the character and line drawing color correcting unit 4. The determination of correction (change) of the original background color and the correction (change) of the original background color are executed for each page of the original data.

The character and line drawing color correcting unit 4 determines whether predetermined readability of characters and line drawings on the background is secured or not as a result of the change of the original background color by the background color changing unit 3. The character and line drawing color correcting unit 4 carries out color correction of the original character and line drawing color in case where the character and line drawing color correcting unit 4 determines that predetermined readability of characters and line drawings on the background is not secured.

The reason for carrying out color correction of the original character and line drawing color is that, if the original background color is changed, the lightness difference between the background color after the change and the original character and line drawing color becomes smaller than before the change, making the characters and line drawings more difficult to read than before the change of the background color, and thus making it hard to secure predetermined readability.

When the color correction of the original character and line drawing color is needed, the character and line drawing color correcting unit 4 carries out color correction of the original character and line drawing color, and thereby secures predetermined readability even after the change of the background color. The color correction of the original character and line drawing color is carried out by increasing or decreasing only the lightness so that the difference in lightness between the original character and line drawing color and the background color reaches a predetermined threshold value (hereinafter, referred to as "lightness difference evaluation threshold value") or higher, while substantially holding the hue and saturation of the original character and line drawing color.

The lightness difference evaluation threshold value is stored in the memory 5. The character and line drawing color correcting unit 4 reads out the lightness difference evaluation threshold value from the memory 5 and then acquires the lightness difference evaluation threshold value. In addition, the character and line drawing color correcting unit 4 acquires the background color information after the change from the background color changing unit 3 and acquires the color information of the original character and line drawing color from the original data analyzing unit 2.

The character and line drawing color correcting unit 4 calculates the difference in lightness (or quantity of lightness correlation) on the basis of the acquired background color information after the change and the color information of the original character and line drawing color. The character and line drawing color correcting unit 4 compares the calculated lightness difference (or difference in quantity of lightness correlation) with the lightness difference evaluation threshold value and determines whether color correction of the original character and line drawing color is necessary or not. When the character and line drawing color correcting unit 4 determines that color correction is necessary, the character and line drawing color correcting unit 4 carries out color correction of the original character and line drawing color.

The color information of the character and line drawing which has its color corrected in accordance with the necessity is outputted from the character and line drawing color correcting unit 4 to outside of the color conversion apparatus 1A. Further, the determination of the necessity of color correction of the original character and line drawing color and the color correction are carried out on all the characters and line drawings in the original, for each page.

If the lightness difference is equal to or more than a predetermined threshold value even when the lightness is increased or decreased, the character and line drawing color correcting unit 4 corrects the character and line drawing color in such a way that the relation with the background color in the magnitude of lightness becomes the same as the original.

Next, the processing executed by the background color changing unit 3, that is, a background color changing procedure, will be described.

Figure 2:
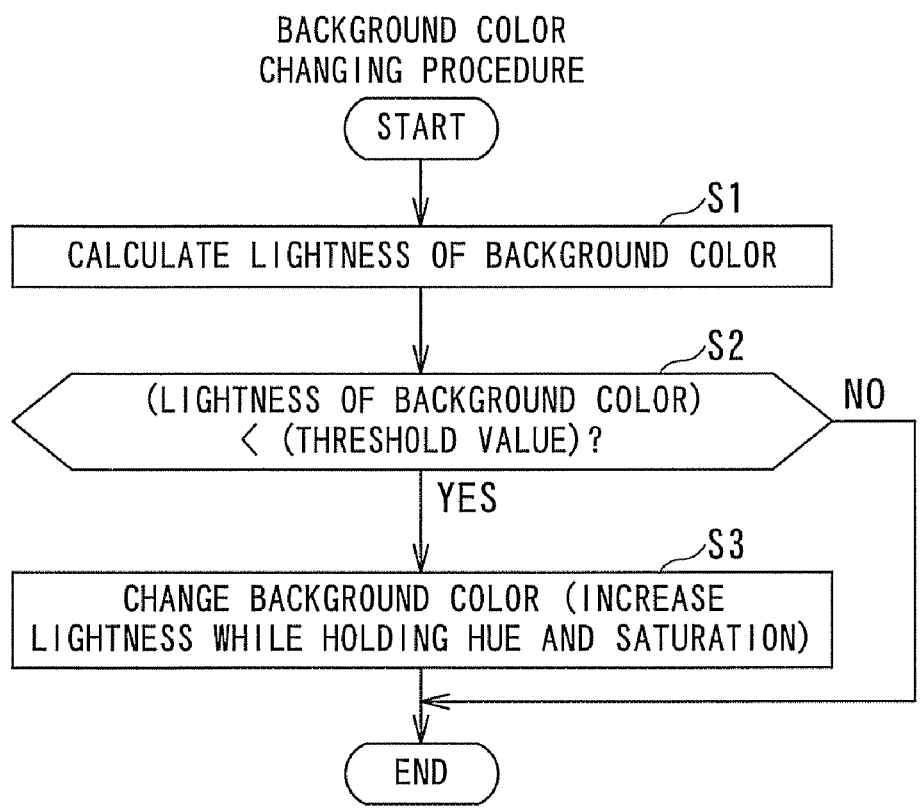
FIG. 2 is a flowchart illustrating a background color changing procedure in a color conversion method according to the invention.

FIG. 2 is a flowchart illustrating the background color changing procedure (steps S1 to S3) executed by the background color changing unit 3.

As shown in FIG. 2, the background color changing procedure includes a step to calculate the lightness of the original background color (step S1), an original background color evaluation step to evaluate whether the original background color is a color that requires a large amount of color material (step S2), and an original background color changing step (step S3) to change the original background color if it is determined in the original background color evaluation step that the original background color is a color that requires a large mount of color material (YES in step S2).

In the background color changing procedure, processing starts when the background color changing unit 3 has acquired the value of the original background color from the original data analyzing unit 2 (START). First, in step S1, the background color changing unit 3 calculates the lightness of the original background color (step S1).

For example, in the case where the color space is of RGB, either min(R, G, B) or (max(R, G, B)+min(R, G, B)) may be employed for the calculated lightness. Here, min(R, G, B) is a function to extract an element with the smallest value of R, G and B. Max(R, G, B) is a function to extract an element with the largest value of R, G and B.

As the background color changing unit 3 calculates the lightness (lightness values) of the original background color, the background color changing unit 3 in step S2 determines whether the original background color is a color that requires a large amount of color material or not, on the basis of the calculated lightness value. Specifically, in the case where the lightness of the background color is less than a predetermined background color lightness evaluation threshold value, it is determined that the color requires a large amount of color material (step S2).

If the background color changing unit 3 has determined that the original background color is a color that requires a large amount of color material (YES in step S2), the processing goes to step S3. The background color changing unit 3 increases the lightness L while holding its saturation S and hue H (step S3). That is, the background color changing unit 3 changes the color coordinate value of the background color of the original so that it can be printed with a smaller amount of color material.

For example, in the case where the color space is of RGB,
lightness L=(max(R, G, B)+min(R, G, B))/2.0,
saturation S=(max(R, G, B)−min(R, G, B))/2.0, and
hue H=(value defined by the HLS colorimetric system)
are set. The R, G and B values are changed to increase the lightness L at a predetermined pitch while the saturation S and the hue H are maintained.

When the background color changing unit 3 has increased the lightness L of the background color, all the steps in the background color changing procedure end (END).

On the other hand, if the background color changing unit 3 has determined that the original background color is not a color that requires a large amount of color material (NO in step S2), the processing goes to END. Thus, all the steps in the background color changing procedure end (END).

The processing executed by the character and line drawing color correcting unit 4, that is, a character and line drawing color correction procedure, will now be described.

Figure 3:
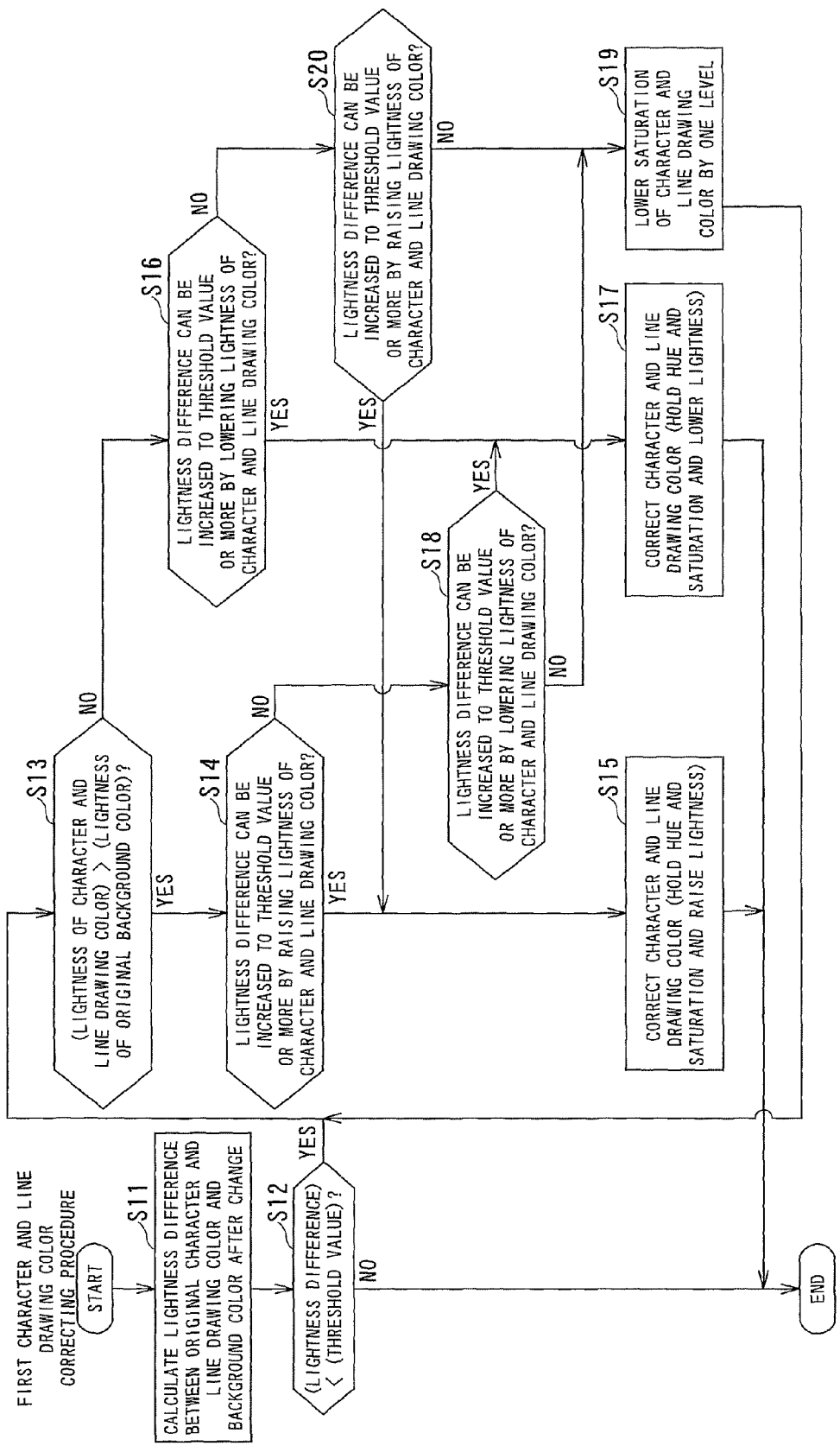
FIG. 3 is a flowchart illustrating a character and line drawing color correcting procedure in a color conversion method according to the first embodiment of the invention.

FIG. 3 is a flowchart illustrating the character and line drawing color correcting procedure executed by the character and line drawing color correcting unit 4 of the color conversion apparatus 1A (hereinafter, referred to as "first character and line drawing color correcting procedure").

As shown in FIG. 3, the character and line drawing color correcting procedure (steps S11 to S20) includes a lightness difference calculation step to calculate the lightness difference between the original character and line drawing color and the background color after the execution of the background color changing procedure (step S11), an original character and line drawing color correction necessity determination step to determine the necessity of correction of the original character and line drawing color based on the result of comparing the lightness difference calculated in the lightness difference calculation step with a predetermined lightness difference evaluation threshold value (steps S12 to S14, step S16, step S18 and step S20), and an original character and line drawing color correction step to correct the original character and line drawing color if it is determined that correction is necessary in the original character and line drawing color correction necessity determination step (step S15, step S17 and step S19).

The character and line drawing color correcting procedure starts when the character and line drawing color correcting unit 4 has acquired information of the original background color and information of the character and line drawing color before color change, from the original data analyzing unit 2, and has acquired information of the background color after the execution of the background color changing procedure, from the background color changing unit 3 (START).

First, the character and line drawing color correcting unit 4 calculates the lightness difference between the original character and line drawing color and the background color after the execution of the background color changing procedure (step S11). When the calculation of the lightness difference is finished, the calculated lightness difference is compared with a lightness difference evaluation threshold value (step S12).

If the calculated lightness difference is larger than the lightness difference evaluation threshold value as a result of comparing the calculated lightness with the lightness difference evaluation threshold value (NO in step S12), it is determined that color correction of the original character and line drawing color is not necessary and the character and line drawing color correcting procedure ends without performing color correction (END).

On the contrary, if the calculated lightness difference is smaller than the lightness difference evaluation threshold value as a result of comparing the calculated lightness difference with the lightness difference evaluation threshold value (YES in step S12) the processing goes to step S13. In steps S13 to S20, the character and line drawing color correcting unit 4 carries out color correction of the character and line drawing.

In step S13, the character and line drawing color correcting unit 4 compares the lightness of the character and line drawing with the lightness of the original background color (step S13). If the lightness of the character and line drawing color is larger than the lightness of the original background color (YES in step S13), the processing goes to step S14.

In step S14, the character and line drawing color correcting unit 4 determines whether the lightness difference can be increased to the threshold value or more by raising the lightness while holding the hue and saturation of the character and line drawing color (step S14).

If the lightness difference can be increased to the threshold value or more by raising the lightness of the character and line drawing color (YES in step S14), the character and line drawing color correcting unit 4 carries out color correction to raise the lightness so that the lightness difference reaches the threshold value or more while holding the hue and saturation of the character and line drawing (step S15). Upon completion of the color correction in step S15, the character and line drawing color correcting procedure ends (END).

On the other hand, if the lightness of the character and line drawing is less than the lightness of the original background color in step S13 (NO in step S13), the processing goes to step S16.

In step S16, the character and line drawing color correcting unit 4 determines whether the lightness difference can be increased to the threshold value or more by lowering the lightness while holding the hue and saturation of the character and line drawing color (step S16).

If the lightness difference can be increased to the threshold value or more (YES in step S16), the character and line drawing color correcting unit 4 carries out color correction to lower the lightness so that the lightness difference reaches the threshold value or more while holding the hue and saturation of the character and line drawing (step S17). Upon completion of the color correction in step S17, the character and line drawing color correcting procedure ends (END).

On the other hand, if the lightness of the character and line drawing color is greater than the lightness of the original background color and the lightness difference cannot be increased to the threshold value or more even by raising the lightness of the character and line drawing (NO in step S14), the processing goes to step S18.

In step S18, the character and line drawing color correcting unit 4 determines whether the lightness difference can be increased to the threshold value or more by lowering the lightness of the character and line drawing color. If the character and line drawing color correcting unit 4 has determined that the lightness difference cannot be increased to the threshold value or more by lowering the lightness of the character and line drawing color (NO in step S18), the processing goes to step S19. The character and line drawing color correcting unit 4 carries out color correction to lower the saturation of the character and line drawing by a predetermined pitch (step S19).

Upon completion of the color correction in step S19, the processing goes back to step S13. The steps following step S13 are executed to carry out further color correction in the character and line drawing color correcting unit 4.

On the other hand, if the character and line drawing color correcting unit 4 in step S16 has determined that the lightness difference cannot be increased to the threshold value or more even by lowering the lightness while holding the hue and saturation of the character and line drawing (NO in step S16), the processing goes to step S20. In step S20, the character and line drawing color correcting unit 4 determines whether the lightness difference can be increased to the threshold value or more by raising the lightness of the character and line drawing color.

If the character and line drawing color correcting unit 4 has determined that the lightness difference can be increased to the threshold value or more by raising the lightness of the character and line drawing (YES in step S20), the processing goes to step S15. The character and line drawing color correcting unit 4 carries out the steps following step S15. On the contrary, if it is determined that the lightness difference cannot be increased to the threshold value or more even by raising the lightness of the character and line drawing (NO in step S20), the processing goes to step S19. The character and line drawing color correcting unit 4 carries out the steps following step S19.

Meanwhile, in step S18, if the character and line drawing color correcting unit 4 has determined that the lightness difference can be increased to the threshold value or more by lowering the lightness of the character and line drawing color (YES in step S18), the processing goes to step S17. The steps following step S17 are carried out.

In the character and line drawing color correcting procedure, for example, in the case where the color space is of RGB, the method for correcting the lightness L while holding the hue H and the saturation S includes setting lightness L=(max(R, G, B)+min(R, G, B))/2.0
saturation S=(max(R, G, B)−min(R, G, B))/2.0
hue H=(value defined by the HLS colorimetric system)

and changing the R, G and B values to correct the lightness L while holding the hue H and the saturation S. The determination of whether the lightness difference reaches the threshold value or more may be carried out by finding the lightness L in accordance with the above equation and evaluating the lightness difference.

Next, a color conversion method according to the first embodiment of the invention will be described.

The color conversion method according to the first embodiment of the invention (hereinafter, referred to as "first color conversion method") includes an original color information acquiring procedure to analyze original data and acquire background color information before color change and character and line drawing object color information for each page, a background color changing procedure to determine the necessity of color correction based on the lightness of the original background color and carry out color correction of the original background color when the color correction is necessary, and a character and line drawing color correcting procedure to determine the necessity of color correction based on the lightness of the original character and line drawing color and carry out color correction of the original character and line drawing color when the color correction is necessary.

The first color conversion method can be carried out, for example, using the color conversion apparatus 1A. As the color conversion apparatus 1A executes the processing in order of the original color information acquiring procedure, the background color changing procedure, and the character and line drawing color correcting procedure, the first color conversion method is carried out.

In the original color information acquiring procedure of the first color conversion method, the original data analyzing unit 2 analyzes original data and acquires color information of the original background color and color information of the original character and line drawing object color for each page. Then, the color information of the original background color acquired in the original color information acquiring procedure is transmitted from the original data analyzing unit 2 to the background color changing unit 3 and the character and line drawing color correcting unit 4. The color information of the original character and line drawing color acquired in the original color information acquiring procedure is transmitted from the original data analyzing unit 2 to the character and line drawing color correcting unit 4.

In the background color changing procedure, the background color changing unit 3 changes the lightness of the original background color in the case where the original background color is a color that requires a large amount of color material in accordance with the color information of the original background color acquired from the original data analyzing unit 2. The color information of the background color after the execution of the background color changing procedure is transmitted from the background color changing unit 3 to the character and line drawing color correcting unit 4. It is noted that the details of the background color changing procedure are as shown in FIG. 2 described above and therefore will not be described further.

In the character and line drawing color correcting procedure, the character and line drawing color correcting unit 4 carried out color correction of the original character and line drawing in the case where predetermined readability of the character and line drawing is not secured, in accordance with the color information of the original background color and the color information of the original character and line drawing color acquired from the original data analyzing unit 2 and the color information of the background color after the execution of the background color changing procedure acquired from the background color changing unit 3. It is noted that the details of the character and line drawing color correcting procedure areas shown in FIG. 3 described above and therefore will not be described further.

With the color conversion apparatus and the color conversion method according to the first embodiment of the invention, original data is analyzed, and the lightness is increased in the case where the background having a large area is of a color that consumes a large amount of color material. Further, as the background color is changed (the lightness of the background color is increased), a color which becomes less visible may be detected from character and line drawing colors on the background. when the character and line drawing colors become less visible, the lightness is corrected so that the lightness difference between the background color and the character and line drawing color increases. Thus, the character and line drawing on the background is made more visible.

That is, with the color conversion apparatus and the color conversion method according to the first embodiment of the invention, the consumption of color material (quantity of overlap of color material) for the background having a large area can be effectively reduced and predetermined visibility can be secured for the character and line drawing on the background.

As a result, the color conversion apparatus and the color conversion method according to the first embodiment of the invention can contribute to saving of the color material, reduction in load on the printer engine, prevention of stripping of the color material and prevention of deformation (for example, curling) of the printed paper, while securing predetermined visibility.

Second Embodiment

Figure 4:
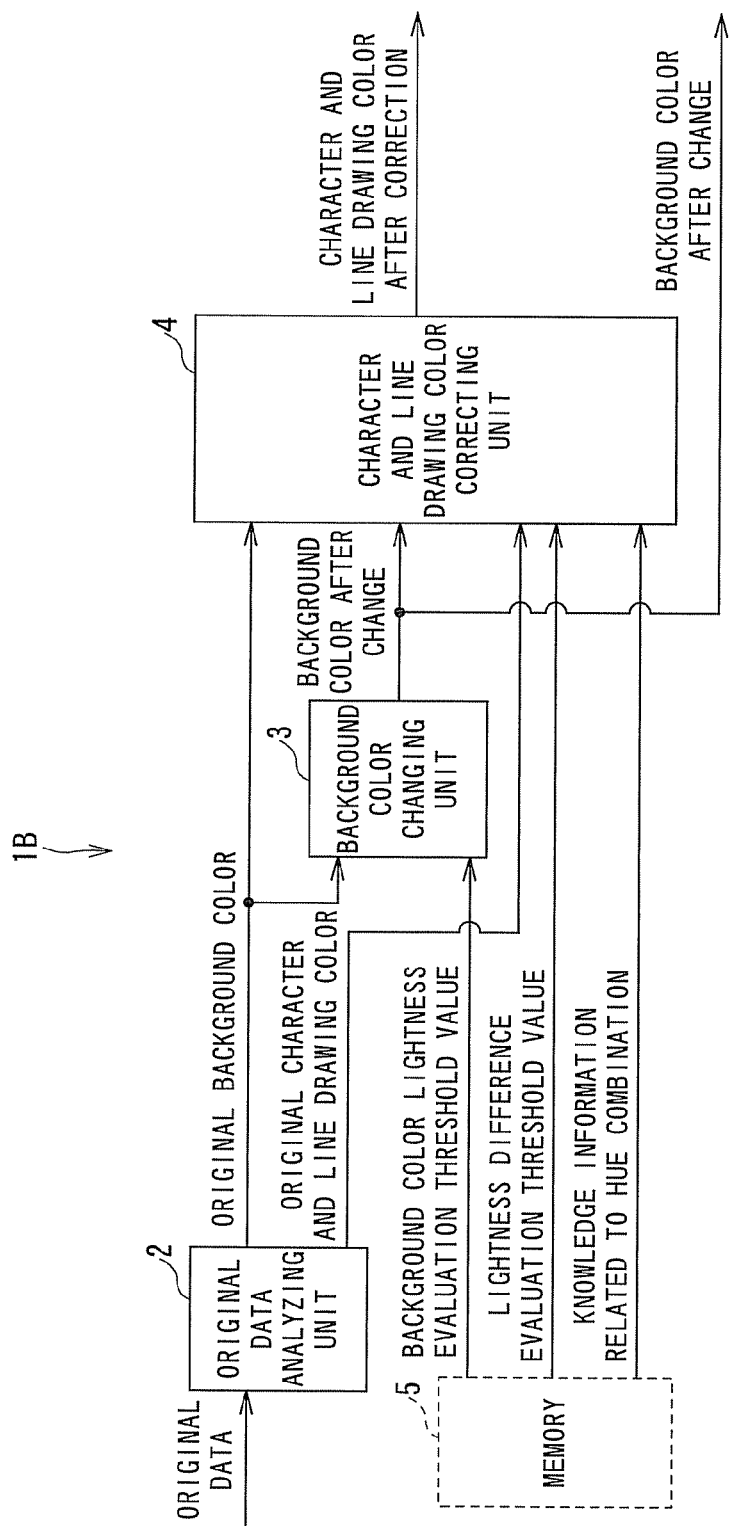
FIG. 4 is a schematic configuration diagram illustrating a configuration of a color conversion apparatus according to a second embodiment of the invention.

FIG. 4 is a schematic configuration diagram illustrating a configuration of a color conversion apparatus 1B, which is an example of a color conversion apparatus according to a second embodiment of the invention.

The color conversion apparatus 1B is different from the color conversion apparatus 1A in the information acquired by the original data analyzing unit 2 and the character and line drawing color correcting unit 4. However, the conversion apparatus 1B does not differ from the color conversion apparatus 1A in that the conversion apparatus 1B includes the original data analyzing unit 2, the background color changing unit 3, and the character and line drawing color correcting unit 4. Thus, in the description of the color conversion apparatus 1B, the substantially same elements as in the color conversion apparatus 1A are denoted by the same reference numerals and the difference from the color conversion apparatus 1A will be mainly described.

As shown in FIG. 4, the color conversion apparatus 1B includes the original data analyzing unit 2, the background color changing unit 3, and the character and line drawing color correcting unit 4, similarly to the color conversion apparatus 1A. In the memory 5, knowledge information related to a combination of hue of the background color and hue of the character and line drawing color (hereinafter, simply referred to as "hue combination information") is stored in addition to the background color lightness evaluation threshold value and the lightness difference evaluation threshold value.

Here, the hue combination information is information related to a combination of hue of the background color and hue of the character and line drawing color that makes the character and line drawing less visible on the background in the case where the background color and the character and line drawing on the background have a very little lightness difference.

Accordingly, the character and line drawing color correcting unit 4 of the color conversion apparatus 1B can determine whether the combination of the hue of the background color and the hue of the character and line drawing on the background is a combination that makes the character and line drawing on the background less visible, in accordance with the information representing the hue of the background color of the original and the hue of the character and line drawing on the background acquired based on the information transmitted from the original data analyzing unit 2, and the hue combination information.

That is, in the color conversion apparatus 1B, when evaluating readability of the character and line drawing on the background, the character and line drawing color correcting unit 4 can make evaluation by considering not only the lightness difference between the background color and the character and line drawing but also the combination of the hue of the background color of the original and the hue of the character and line drawing color.

Next, a color conversion method according to the second embodiment of the invention will be described.

The color conversion method according to the second embodiment of the invention (hereinafter, referred to as "second color conversion method") can be carried out, for example, by using the color conversion apparatus 1B. It is similar to the first color conversion method in that the color conversion apparatus 1B executed processing in order of the original color information acquiring procedure, the background color changing procedure, and the character and line drawing color correcting procedure.

Although the second color conversion method does not substantially differ from the first color conversion method in the original color information acquiring procedure and the background color changing procedure, the second color conversion method differs from the first color conversion method in the specific processing of the character and line drawing color correcting procedure. Thus, with respect to the second color conversion method, the character and line drawing color correcting procedure will be described, while the original color information acquiring procedure and the background color changing procedure, which are not substantially different, will not be described.

Figure 5:
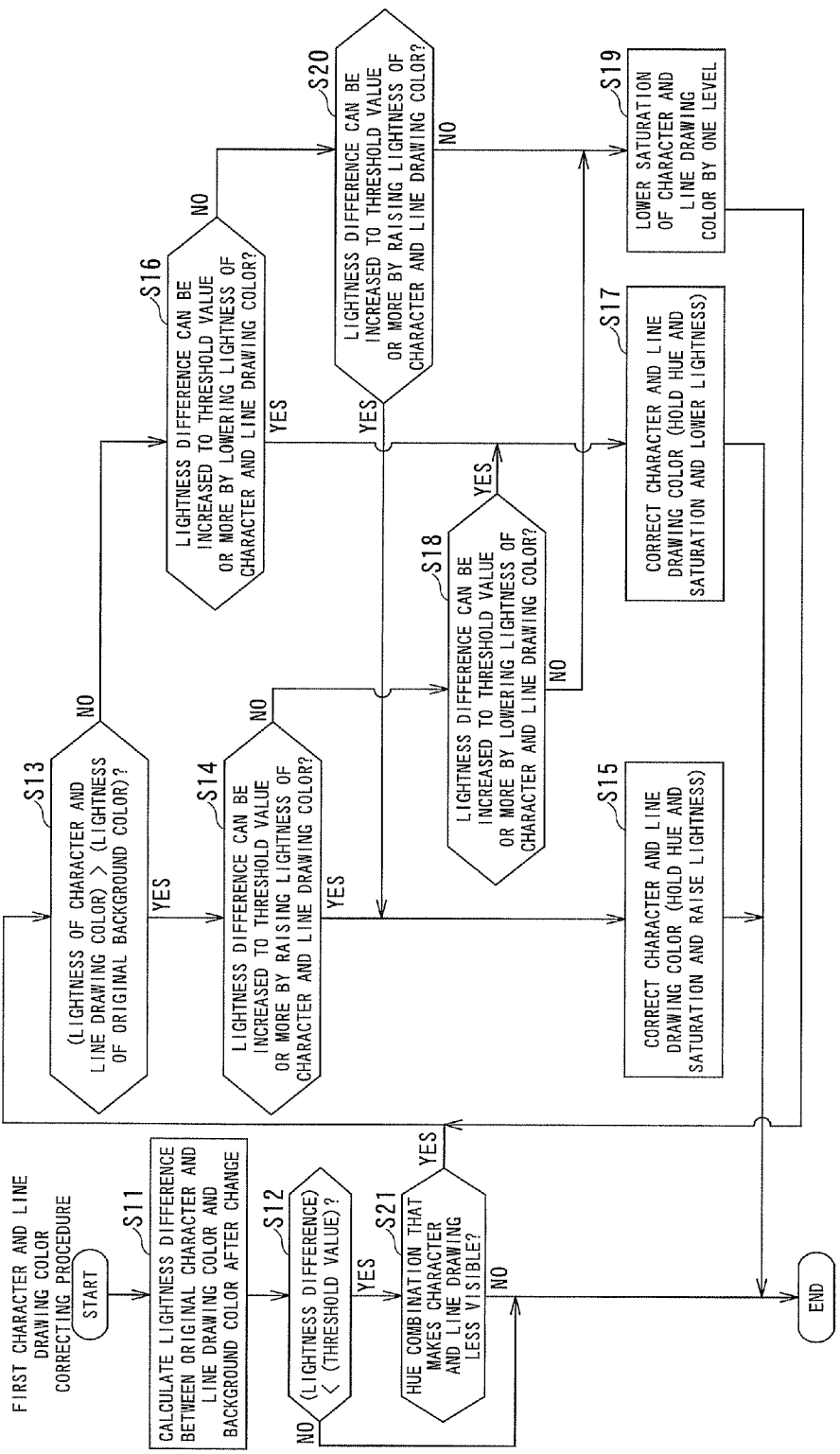
FIG. 5 is a flowchart illustrating a character and line drawing correcting procedure in a color conversion method according to the second embodiment of the invention.

FIG. 5 is a flowchart illustrating the character and line drawing color correcting procedure executed by the character and line drawing color correcting unit 4 of the color conversion apparatus 1B (hereinafter, referred to as "second character and line drawing color correcting procedure").

As shown in FIG. 5, the second character and line drawing color correcting procedure (step S11 to S21) includes a lightness difference calculation step, an original character and line drawing color correction necessity determination step, and an original character and line drawing color correction step. When compared with each other, the second character and line drawing color correcting procedure shown in FIG. 5 and the procedure shown in FIG. 3 (hereinafter, referred to as "first character and line drawing color correcting procedure") differ from each other in the specific processing of the original character and line drawing color correction necessity determination step.

Specifically, the original character and line drawing color correction necessity determination step in the second character and line drawing color correcting procedure includes step S21 in addition to all the steps of the original character and line drawing color correction necessity determination step in the first character and line drawing color correcting procedure.

According to FIG. 5, in the original character and line drawing color correction necessity determination step in the second character and line drawing color correcting procedure, first, step S11 is executed and then step S12 is executed. After step S12 is executed, in step S21, the character and line drawing color correcting unit 4 evaluates visibility of the character and line drawing existing on the background on the basis of the combination of the hue (hereinafter, referred to as "original background color hue") of the background color of the original and the hue (hereinafter, referred to as "original character and line drawing color hue") of the character and line drawing color of the original.

In step S21, if the character and line drawing color correcting unit 4 has determined that the character and line drawing existing on the background is less visible in consideration of the combination of original background color hue and original character and line drawing color hue (YES in step S21), the processing goes to step S13. The character and line drawing color correcting unit 4 executes the steps following step S13.

On the other hand, if the character and line drawing color correcting unit 4 has determined that the character and line drawing existing on the background is visible in consideration of the combination of original background color hue and original character and line drawing color hue (NO in step S21), the processing goes to END. Thus, the second character and line drawing color correcting procedure ends (END).

In the second character and line drawing color correcting procedure shown in FIG. 5, the processing goes to step S13 if the result is YES in step S12 and also the result is YES in step S21. However, the processing flow in the second character and line drawing color correcting procedure may proceed to step S13 if the result is YES in either step S12 or step S21.

Further, in the second character and line drawing color correcting procedure, step S21 may be executed immediately after the start, that is, before step S11.

With the color conversion apparatus and the color conversion method according to the second embodiment of the invention, when evaluating readability of the character and line drawing on the background, the character and line drawing color correcting unit 4 can make evaluation also by considering the combination of original background color hue and original character and line drawing color hue. Therefore, the accuracy of the evaluation of readability of the character and line drawing on the background can be improved further.

In other words, even in the case where it is determined that color correction of the character and line drawing on the background is necessary in the color conversion apparatus and the color conversion method according to the first embodiment of the invention, if it is determined that the character and line drawing on the background is not hard to read (not less visible) in consideration of the combination of original background color hue and original character and line drawing color hue in the color conversion apparatus and the color conversion method according to the second embodiment of the invention, the color correction processing to the character and line drawing color on the background (step S15, step S17 and step S19) is not executed.

As a result, in the color conversion apparatus and the color conversion method according to the second embodiment of the invention, the color correction processing to the character and line drawing color can be limited to the minimum necessary extent.

As described above, according to the present invention, a background color that consumes a large amount of color material is detected from background colors having a large area on the basis of analysis of original data. The lightness of the detected background color is increased to change the background color so that it can be outputted with a smaller amount of color material. Therefore, the consumption of the color material and the quantity of overlap of the color material for the whole document data can be effectively reduced. Thus, saving of the color material, reduction in the load on the printer engine, prevention of stripping of the color material, and the prevention of curling of paper can be realized.

Further, as the above change of the background color (increase in lightness) is carried out, a color that become less visible is detected from the character and line drawing colors on the background on the basis of the lightness difference from the background color after the change. The lightness is then corrected in a way that increases the lightness difference. Therefore, printing can be carried out with the character and line drawing made more visible.

In the above change and correction of the background color as well as the character and line drawing color, only the lightness is changed in principle and the hue and saturation are maintained. Therefore, the original coloring image can be maintained.

The present invention is particularly effective for an original that has a large background part and uses a color with low lightness for the background, for example, an original for presentation.

In the description of the color conversion apparatuses 1A and 1B, it is assumed that the single memory 5 storing the background color lightness evaluation threshold value and the lightness difference evaluation threshold value is provided outside of the color conversion apparatuses 1A and 1B. However, plural, for example, two memories 5 may be provided.

For example, the background color lightness evaluation threshold value may be stored in a first memory, and the lightness difference evaluation threshold value may be stored in a second memory.

Further, the color conversion apparatuses 1A and 1B may include the memory 5.

For example, the color conversion apparatuses 1A and 1B may have the memory 5 separately from the original data analyzing unit 2, the background color changing unit 3, and the character and line drawing color correcting unit 4. The color conversion apparatuses 1A and 1B may also have the memory 5 in one of the original data analyzing unit 2, the background color changing unit 3, and the character and line drawing color correcting unit 4. Moreover, the color conversion apparatuses 1A and 1B may have the first memory storing the background color lightness evaluation threshold value, in the background color changing unit 3, and the second memory housing the lightness difference evaluation threshold value, in the character and line drawing color correcting unit 4.

The present invention is not limited to each of the above embodiments. Practically, its elements may be embodied in a modified manner without departing from the scope of the invention. Further, various inventions can be made by suitably combining plural elements disclosed in each of the embodiments.

For example, some elements can be eliminated from all the elements disclosed in the embodiments. Further, elements in difference embodiments may be suitably combined.

What is claimed is:

1. A color conversion apparatus comprising:
   an original data analyzing unit configured to analyze an inputted original data, and to extract background color information and color information of a character and line drawing object;
   a background color changing unit configured to increase lightness of a background color of the inputted original data on the basis of the background color information acquired from the original data analyzing unit and change to a background color for printing; and
   a character and line drawing color correcting unit configured to change lightness in a way that increases the lightness difference between the background color for printing and a character and line drawing color on the background color of the inputted original data and thus change the color information of the character and line drawing on the background color of the inputted original data to a character and line drawing color for printing, if the lightness difference between the background color information of the original acquired from the original data analyzing unit and the background color for printing acquired from the background color changing unit is less than a predetermined threshold value.

2. The color conversion apparatus according to claim 1, wherein the character and line drawing color correcting unit includes:
   an element configured to compare lightness of the character and line drawing color to the lightness of the background color of the inputted original data; and
   an element configured to carries out color correction to raise the lightness so that the lightness difference reaches a predetermined threshold value or more while holding the hue and saturation of the character and line drawing if the comparison element determines that the lightness of the character and line drawing color is larger than the lightness of the background color of the inputted original data.

3. The color conversion apparatus according to claim 1, wherein the character and line drawing color correcting unit includes:
   an element configured to compared lightness of the character and line drawing color to lightness of the background color of the inputted original data; and
   an element configured to carries out color correction to decrease the lightness so that the lightness difference reaches a predetermined threshold value or more while holding the hue and saturation of the character and line drawing if the comparison element determines that the lightness of the character and line drawing color is less than the lightness of the background color of the inputted original data.

4. The color conversion apparatus according to claim 1, wherein the character and line drawing color correcting unit includes an element configured to determine whether a combination of the hue of the background color for printing and the hue of the character and line drawing color on the background color for printing is a combination that makes the character and line drawing on the background color for printing less visible or not.

5. The color conversion apparatus according to claim 1, wherein the background color information and color information of a character and line drawing object extracted by the original data analyzing unit are values representing a color space, the color apace is one of RGB color space, CMYK color apace, CIEXYZ and CIELAB.

6. The color conversion apparatus according to claim 1, wherein the background color changing unit is configured to evaluate whether the background color of the inputted original data is a color which consumes a large quantity of color material or not, and to increase the lightness of the background color of the inputted original data if the background color of the inputted original data is evaluated that a color which consumes a large quantity of color material.

7. The color conversion apparatus according to claim 6, wherein the background color changing unit is configured to evaluate that the background color of the inputted original data is a color that consumes a large quantity of color material if the lightness of the background color of the inputted original data is less than a predetermined threshold value.

8. The color conversion apparatus according to claim 6, wherein the background color changing unit is configured to increases the lightness of the background color of the inputted original data if a background of the inputted original data having large area in an original is a color that consumes a large quantity of color material.

9. The color conversion apparatus according to claim 1, wherein the character and line drawing color correcting unit includes:
   a character and line drawing readability evaluating element configured to evaluate readability of the character and line drawing on the background color of the inputted original data; and
   a character and line drawing color correcting element configured to change the character and line drawing color on the background of the inputted original data to a character and line drawing color for printing based on a result of evaluating readability of the character and line drawing on the background color of the inputted original data.

10. The color conversion apparatus according to claim 9, wherein the character and line drawing color correcting element configured to change the lightness while holding the hue and saturation of the character and line drawing color in a way that increases the lightness difference between the background color for printing and the character and line drawing color on the background color of the inputted original data and thus change the character and line drawing color on the background of the inputted original data to a character and line drawing color for printing.

11. A color conversion method comprising:
analyzing an inputted original data, and extracting background color information and color information of a character and line drawing object;
increasing lightness of the background color of the inputted original data on the basis of the background color information acquired at the extracting step and changing from the background color of the inputted original data to a background color for printing; and
changing lightness in a way that increases the lightness difference between the background color for printing and a character and line drawing color on the background color of the inputted original data and thus changing the color information of the character and line drawing on the background color of the inputted original data to a character and line drawing color for printing, if the lightness difference between the background color information of the original acquired at the extracting step and the background color for printing acquired at the extracting step is less than a predetermined threshold value.

12. The color conversion method according to claim 11, wherein the character and line drawing color changing step includes:
comparing lightness of the character and line drawing color to the lightness of the background color of the inputted original data; and
carrying out color correction to raise the lightness so that the lightness difference reaches a predetermined threshold value or more while holding the hue and saturation of the character and line drawing if the lightness of the character and line drawing color is larger than the lightness of the background color of the inputted original data.

13. The color conversion method according to claim 11, wherein the character and line drawing color changing step includes:
comparing lightness of the character and line drawing color to lightness of the background color of the inputted original data; and
carrying out color correction to decrease the lightness so that the lightness difference reaches a predetermined threshold value or more while holding the hue and saturation of the character and line drawing if the comparison element determines that the lightness of the character and line drawing color is less than the lightness of the background color of the inputted original data.

14. The color conversion method according to claim 11, further comprising determining whether a combination of the hue of the background color for printing and the hue of the character and line drawing color on the background color for printing is a combination that makes the character and line drawing on the background color for printing less visible or not.

15. The color conversion method according to claim 11, wherein the background color information and color information of a character and line drawing object extracted at the extracting step are values representing a color space, the color apace is one of RGB color space, CMYK color apace, CIEXYZ and CIELAB.

16. The color conversion method according to claim 11, wherein the background color lightness increasing step includes:
evaluating whether the background color of the inputted original data is a color which consumes a large quantity of color material or not; and
increasing the lightness of the background color of the inputted original data if the background color of the inputted original data is evaluated that a color which consumes a large quantity of color material.

17. The color conversion method according to claim 16, wherein the background color of the inputted original data is evaluated that a color which consumes a large quantity of color material if the lightness of the background color of the inputted original data is less than a predetermined threshold value.

18. The color conversion method according to claim 16, wherein the lightness of the background color of the inputted original data is increased if a background of the inputted original data having large area in an original is a color that consumes a large quantity of color material.

19. The color conversion method according to claim 11, wherein the character and line drawing color changing step includes:
evaluating readability of the character and line drawing on the background color of the inputted original data; and
changing the character and line drawing color on the background of the inputted original data to a character and line drawing color for printing based on a result of evaluating readability of the character and line drawing on the background of the inputted original data.

20. The color conversion method according to claim 19, wherein the character and line drawing color on the background of the original is changed by changing the lightness while holding the hue and saturation of the character and line drawing color in a way that increases the lightness difference between the background color for printing and the character and line drawing color on the background color of the inputted original data and thus change the character and line drawing color on the background of the inputted original data to a character and line drawing color for printing.

* * * * *